United States Patent Office 3,260,643
Patented July 12, 1966

3,260,643
COMBATING PLANT DISEASES WITH PHENOXY-ETHYL - DIMETHYL - DODECYL - AMMONIUM HALIDES
Trevor Watkyn Jones, Horfield, Bristol, England, assignor to Ciba Limited, Basel, Switzerland, a company of Switzerland
No Drawing. Filed Apr. 9, 1963, Ser. No. 271,564
Claims priority, application Great Britain, Apr. 18, 1962, 15,122/62
4 Claims. (Cl. 167—30)

The present invention provides a method of combating plant diseases caused by phytopathogenic micro-organisms, especially fungi or bacteria, wherein plants that are infected with such a micro-organism or are to be protected against attack thereby are treated with a quaternary compound of N-(β-phenoxyethyl)-dimethylamine containing bound to the quaternary nitrogen atom an alkyl radical of at least 8, and preferably 8 to 16, carbon atoms.

In the method of the invention there is used for treating the plants more especially a quaternary compound of the formula (1) 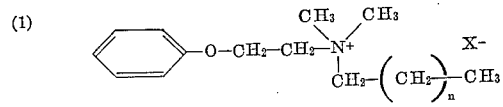

in which $n$ is the whole number 6 or 10, and $X^-$ represents a chlorine or bromine ion, and particularly the compound of the formula (2) 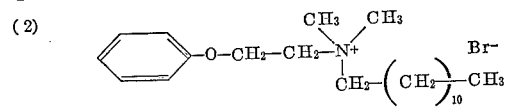

In the method of the invention the quaternary ammonium compounds may be used in the form of a preparation which comprises the quaternary ammonium compound in admixture with one or more of the following ingredients: solvents, diluents, emulsifiers, dispersing agents, wetting agents, adhesive agents, fertilizers or other pest-combating agents; and the invention also includes such preparations.

The preparations are advantageously applied to the plants at a concentration within the range of from 0.005 to 0.05 percent by weight of the quaternary ammonium compound.

There are used more especially preparations as defined above, in which the quaternary compound is of the Formula 1 above, and particularly of the Formula 2 above.

Further examples of quaternary compounds to be used in accordance with the invention are:

β-Phenoxyethyl-dimethyl-dodecyl-ammonium chloride,
β-Phenoxyethyl - dimethyl-dodecyl-ammonium para-toluene sulfonate,
β-Phenoxyethyl-dimethyl-octyl-ammonium bromide, and
β-Phenoxyethyl-dimethyl-hexadecyl-ammonium bromide.

The quaternary compounds used in accordance with the invention may be prepared by methods known in themselves.

The aforesaid quaternary compounds are especially suitable for combating so-called true powdery mildew fungi, namely Erysiphaceae, and especially *Sphaerotheca pannosa*, *Sphaerotheca humuli*, *Erysiphe polygoni* and *Sphaerotheca mors-uvae*, and so-called leaf spot fungi, such as *Septoria apii*, *Phytophthora infestans* and *Alternaria solani*.

The quaternary compound of the above Formula 2 is especially effective against these micro-organisms.

An especially advantageous form of the method of the invention consists in using the compound of the above Formula 2 for combating true powdery mildew on roses caused by *Sphaerotheca pannosa*, and also black spot on roses (*Actinonema rosae*). That compound is also especially suitable for combating true powdery mildew, e.g. species of Sphaerotheca on strawberries, gooseberries, red currants, black currants and hops, and *Erysiphe polygoni* on Brussels sprouts. It is also effective against fungi causing leaf spot, e.g. *Septoria apii* on celery, *Phytophthora infestans* and *Alternaria solani* on tomatoes.

Among the phytopathogenic bacteria that can be combated by the method of the invention there may be mentioned, for example Corynebacterium, Erwinia, Pseudomonas and Xanthomonas.

Of special importance is the fact that the quaternary compounds used in accordance with the invention cause substantially no damage to the plants treated therewith.

It could not have been foreseen that the aforesaid quaternary compounds, and in particular β-phenoxyethyl-dimethyl-dodecyl-ammonium bromide, would exhibit on plants an excellent action against the phytopathogenic micro-organisms mentioned above, especially as those phytopathogenic micro-organisms differ fundamentally in their properties, living conditions and metabolic processes from the micro-organisms to be combated in disinfecting the skin, surgical instruments and bandage materials.

It is known that the very marked differentiation within the kingdom of lower plants makes it impossible, to deduce from the known effect of an active substance upon a certain species of micro-organisms, for example, bacteria that infect the skin, its effect upon very different species of micro-organisms, such, for example, as phytopathogenic fungi.

Moreover, it could not have been foreseen that the quaternary compounds mentioned above, notwithstanding their strong activity against the aforesaid noxious micro-organisms, would not also damage the higher plants treated with them. It is known that active quaternary compounds very often damage high plants, for example, burn their leaves, this risk being particularly great when highly active compounds are used. Furthermore, in the case of exceptionally sensitive culture plants, such as roses, the expectation of causing damage to the plants, especially burning of the leaves, by the application of active quaternary compounds, such as are used in accordance with the invention, would be especially great.

Accordingly, it could not have been foreseen that the quaternary compounds used in accordance with the invention would exhibit an excellent action against the aforesaid phytopathogenic micro-organisms coupled with the absence of damage to plants treated with them.

Preparations containing the active substances in a concentrated form can be made up as aqueous or organic solutions, pastes or wettable powders that can be mixed with water to form aqueous liquors ready for use. Suitable emulsifiers or dispersing agents are non-ionic products, such as condensation products of ethylene oxide with aliphatic alcohols, amines or carboxylic acids containing a hydrocarbon radical having about 10 to 20 carbon atoms, for example, a condensation product of octadecyl alcohols with 25 to 30 molecular proportions of ethylene oxide, or of soya bean fatty acid with 30 molecular proportions of ethylene oxide, or of commercial oleylamine with 15 molecular proportions of ethylene oxide, or of dodecyl mercaptan with 12 molecular proportions of ethylene oxide. Suitable cationic dispersing agents are quaternary ammonium compounds, such as cetyl-pyridinium bromide or di-hydroxyethyl-benzyl-dodecyl-ammonium chloride.

Preparations suitable for dusting or scattering may be made up by using a solid carrier, such as bentonite, calcium carbonate or calcium phosphate, or carbon, or wood meal.

The preparation of the invention may contain the active quarternary compounds alone or in admixture with other pest-combating agents, more especially insecticides, acaricides, nematocides, selective herbicides or other fungicides or bactericides.

The preparations may contain the usual additives that improve the distribution, adhesion, resistance to rain or the penetration power. As such substances there may be mentioned fatty acids, resins, glues, casein or alginates.

The following examples illustrate the invention:

EXAMPLE 1

*Action against true powdery mildew: Combating Sphaerotheca pannosa*

The experiments were carried out in the open upon "Josephine Bruce" roses, which are particularly prone to attack by powdery mildew.

Five groups A to E each of four rose bushes were treated with an aqueous solution of 0.015% strength by weight of the compound of the above Formula 2. Each treatment was repeated in all 6 times at intervals of 14 days. For comparison a group of the same bushes was left untreated.

The results were evaluated at the beginning of September according to the folling degrees of infection:

1 = free from infection to slightly infected
2 = moderately infected
3 = strongly infected.

The results are given in the following table:

| Group | A | B | C | D | E |
|---|---|---|---|---|---|
| Degree of infection of treated plants | 1 | 1 | 1 | 1 | 1 |
| Degree of infection of untreated plants | 3 | 3 | 3 | 3 | 3 |

The treated roses did not show any sign of burning of the leaves.

Good results were also obtained in combating the following powdery mildew: *Sphaerotheca humuli* (on strawberries and hops), *Erysiphe polygoni* (on Brussels sprouts), and *Sphaerotheca mors-uvae* (on gooseberries and red currants).

EXAMPLE 2

In a greenhouse the action against leaf spot fungi was tested as follows:

*Septoria apii*—on celery
*Phytophthora infestans*—on tomatoes, and
*Alternaria solani*—on tomatoes.

The test plants were sprayed with an aqueous solution of 0.015% strength by weight of the active compound used in Example 1. Two days after being sprayed the plants were infected with aqueous suspensions of spores of the micro-organisms mentioned above.

The degrees of protection achieved, as compared with the degree of infection of untreated plants, are given below:

Protective action in percent
Septoria appi _____ 100
Phytophthora infestans _____ 83
Alternaria solani _____ 73

The treated plants showed no signs of damage.

EXAMPLE 3

*Action against phytopathogenic bacteria*

An aqueous solution containing the active compound used in Example 1 at a dilution of 1:15,000, such as is conventionally used in plant protection, exhibited in the following disinfection test after a contact period of 2½ minutes a complete bactericidal action on Corynebacterium, Erwinia, Pseudomonas and Xanthomonas.

The test was carried out by introducing from a pipette 0.1 ml. of a suspension of the germs at room temperature into the centres of small Petri dishes and in each case adding 10 ml. of the above dilute aqueous solution of the active compound. At the end of the aforesaid treatment period, a drop of the mixture of the active compound and germs was withdrawn by means of a wire loop having an internal diameter of 4 mm. and used to inoculate 10 ml. of a liquid nutrient. The tubes inoculated with the micro-organisms were incubated at 37° C. and examined after incubation periods of 24 and 48 hours.

What is claimed is:

1. A method for combating phytopathogenic bacteria on plants, which comprises applying to the plants to be treated a bactericidal amount of the compound of the formula

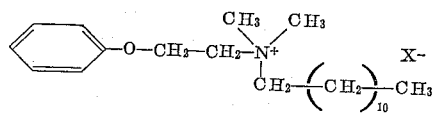

wherein X⁻ represents a member selected from the group consisting of the chlorine ion and the bromine ion.

2. A method for combating true powdery mildew fungi and leaf spot fungi on plants, which comprises applying to the plants a fungicidal amount of the compound of the formula

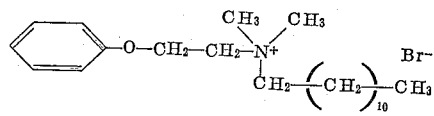

3. A method for combating true powdery mildew fungi on roses which comprises applying to the roses a fungicidal amount of the compound of the formula

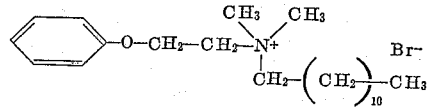

4. A method for combating phytopathogenic fungi on plants which comprises applying to the plants to be treated a fungicidal amount of the compound of the formula

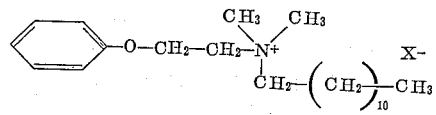

wherein X⁻ represents a member selected from the group consisting of the chlorine ion and the bromine ion.

References Cited by the Examiner

UNITED STATES PATENTS
2,581,336  1/1952  Hartmann et al. _____ 167—30

FOREIGN PATENTS
133,312   11/1948  Australia.
73,469    11/1951  Denmark.
248,346   4/1947   Switzerland.

OTHER REFERENCES

Kutcher et al. Antibiotics and Chemotherapy, 6 (6), pp. 400–403, June 1956.

JULIAN S. LEVITT, *Primary Examiner.*

J. D. GOLDBERG, *Assistant Examiner.*